Sept. 19, 1967  J. H. BROWN ETAL  3,343,151
REFRIGERATION WARNING SYSTEM
Filed July 13, 1964

INVENTORS
JOHN H. BROWN
JAMES F. KINNEY
ARTHUR PEREZ
BY William J. Cerny
ATTORNEY United States Patent Office 3,343,151
Patented Sept. 19, 1967

3,343,151
REFRIGERATION WARNING SYSTEM
John H. Brown, James F. Kinney, and Arthur Perez, Niles, Mich., assignors to Clark Equipment Company, a corporation of Michigan
Filed July 13, 1964, Ser. No. 382,275
5 Claims. (Cl. 340—227)

The present invention relate to a refrigeration warning system, and more particularly to such a system controlled by temperature changes in means simulating the article under refrigeration.

Refrigeration warning devices and systems heretofore provided have employed thermostats or similar devices responding to changes in temperature of the ambient air. As compared to a refrigerated food product, pharmaceutical, or other article, air responds relatively quickly to various factors tending to cause a change in its temperature, and thus is far less constant and predictable, so far as temperature is concerned, than the article under refrigeration. The refrigerated item, of course, because of its latent heat, is not endangered merely by the attainment of the limiting temperature in the surrounding atmosphere, but only upon subjection to such temperature for a sufficient period of time to itself attain that temperature. If the thermostat is set to respond to a temperature close to that at which the refrigerated product or article would suffer damage or deterioration, the warning system will be subject to false warnings, since the air temperature may change to the set temperature to actuate the system, while the refrigerated product is still at a safe temperature considerably removed from the air temperature. To avoid such false alarms, it is necessary to set the thermostat or like device at a point several degrees removed from the danger temperature of the product or article. This provides for a lag between the occurrence of the danger temperature in the air about the thermostat and product, and the occurrence of the same temperature in the product itself, but a change in the air temperature carrying beyond the danger temperature is necessary for actuation of the warning. A considerable possibility exists for error in the length of the lag, by reason of which the product or article may be harmed. There is also a range or area between the danger temperature and the set temperature within which the air temperature may become substantially stable. The atmosphere thus never reaches the set temperature to cause operation of the warning system, while subjecting the refrigerated product or article to a temperature beyond the danger temperature, so that it may deteriorate even though no warning indication is given.

The present invention provides a device which simulates a food or other article or item under refrigeration as to its time-temperature constant, and which therefore when disposed in the same environment as the simulated article may be taken as having a corresponding internal temperature, and employed to control an alarm or warning means. By controlling the warning system in response to the temperature of a device or member simulating the food or other article under refrigeration, the system may be set to respond to a temperature very close to the danger temperature, so that an alarm is given when the product reaches the set or limiting temperature, before any harmful effects or deterioration can set in. Thus it is almost impossible for a false warning to be given by the apparatus of the present invention, and the product or other article is closely monitored against subjection to a harmful temperature.

Prior systems responsive to the air temperature also required an override arrangement so that during the necessary periodic defrosting operations, when the operating temperature of the refrigerating case, and hence of the air in the case, is raised to a point sufficient to cause melting of the frost and ice deposited on the evaporating coils and other parts of the equipment, and to a warming rather than refrigerating level, the warning system is automatically disconnected so as not to sound a warning during the defrosting cycle. If for any reason the defrost operation continues for longer than the normal period, so that the refrigerated item may be endangered by subjection to the elevated temperature, the warning system, being inoperative for the time being, cannot give any alarm or signal as to the unrefrigerated condition of the product or article.

By the present invention, it is not necessary to disconnect or otherwise render the warning arrangement inoperative upon the occurrence of a defrost cycle, so that possible prolongation of the defrost cycle cannot result in raising of the refrigerated item temperature to a possibly harmful point without operation of the warning system to actuate an alarm.

The invention is applicable to preventing subjection of products or articles to temperatures below a given desirable minimum, as well as to temperatures above a given maximum, as for example to prevent fresh meat or other items from reaching a freezing temperature. The invention may be employed to provide warnings for both a lower and an upper temperature limit of a given product or article, to provide for maintenance of the product within a given temperature range.

While the warning system of the present invention is intended primarily for use in connection with commercial refrigerating cases and systems, as in supermarkets or the like, it is also readily applicable to other applications of refrigerating equipment, including household refrigerating equipment. Thus, it may be empolyed in refrigerated transport vehicles such as railway cars or automotive semi-trailers, in cold storage warehouses, institutional refrigerating equipment, and the like.

It is an object of the present invention to provide a temperature-sensitive device simulating a product or article under controlled temperature conditions in having substantially the same time-temperature constant as the product or article.

Another object of the invention is the provision in a refrigeration warning system or the like of a member or body having substantially the same time-temperature constant as the product or article under refrigeration, to control the system for actuating a warning upon development of a predetermined temperature in such member or body.

It is another object of the invention to provide a refrigeration warning system responsive to the temperature of a device or member simulating the product or article under refrigeration, to provide improved control of such temperature.

Another object is the provision of warning devices and apparatus for refrigeration equipment for maintaining substantially at a desired temperature the product or other article being refrigerated, rather than the air surrounding such product or article.

Another object is the provision of an arrangement for maintaining within a given range of temperature an article or product being refrigerated, regardless of temporary fluctuations in the temperature of the ambient air.

It is also an object of the invention to provide a method of warning against development of undesired temperatures in products or articles under refrigeration, including the use in the same environment of a member or body simulating such a product or article in having substantially the same time-temperature constant.

A further object is the provision of a method of protecting against development of an undesired temperature in a product or article, by warning of the occurrence of such temperature in a device or body simulating such product or article.

Other and further objects, advantages and features of the invention will be apparent to those skilled in the art from the following detailed description, taken in conjunction with the accompanying drawings, in which.

Figure 1:
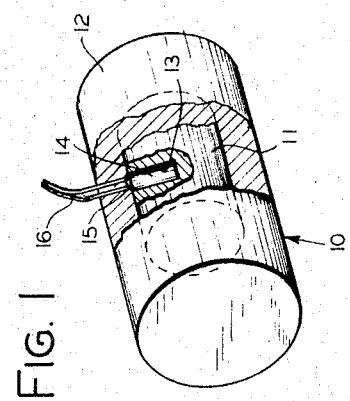
FIGURE 1 is a view in perspective, with parts broken away, of a body or member according to the invention simulating a product or article to be refrigerated.

Referring to the drawings, the body or member shown in FIG. 1, which may be termed a simulator, generally designated as 10, is designed to have the same time-temperature constant as the particular food product or other article it simulates. It may be of almost any desired form and material or a combination of materials, so long as the time-temperature constant, or rate of warming or cooling, corresponds substantially to that of the product or article. In the present case, the simulator 10 is shown as comprising a composite body, cylindrical in form, having a cylindrical core 11 of cold rolled steel enclosed in an envelope or coating 12 of foamed plastic material, such as polyurethane. A diametrically extending aperture 13 is formed at the center of the core 11, to accommodate a temperature responsive control element, in this case a thermistor 14, which is secured and sealed in the aperture 13 by suitable means 15, such as an epoxy resin. The thermistor is secured in place, encapsulated, and insulated by the resin. Leads 16 extend from the thermistor 14 through the epoxy resin or other similar means and through the envelope 12 for connection in the warning circuit. The simulator 10 need not be of composite construction, but may be a mass or body of homogeneous material having the desired time-temperature constant. By appropriate selection of the dimensions and/or materials, the simulator may be made to approximate very closely to the time-temperature constant of the particular product or article in connection with which it is to be used. The particular simulator 10 disclosed, having a time-temperature constant corresponding to that of meat, has a core with a diameter of 1½" and a length of 1⅝". The foamed plastic envelope or coating 12 has an outer diameter of 2⅝" and a length of 3½". Brass might be used for the core 11, and another foamed plastic, such as polystyrene, for the coating, with susbtantially the same results as to time-temperature constant. No formula or rule can be given, however, for determining what material or combination of materials, or what dimensions or proportions of the body or simulator, will achieve the desired correspondence between the simulator and the product or article which it simulates. The lack of predictability requires a determination of the time-temperature constant of the product or other item to be refrigerated, and the provision of a body or mass conforming thereto, by experimental and trial-and-error methods. The composite simulator 10 as disclosed has been found advantageous, because by varying the dimensions of the core and the foamed plastic envelope its time-temperature constant is changed to correspond closely to a plurality of different products or articles. It is not necessary that the simulator 10 correspond exactly to the product or article it simulates. The time-temperature or warm-up curves, in other words, need not coincide, but should be substantially parallel.

Figure 2:
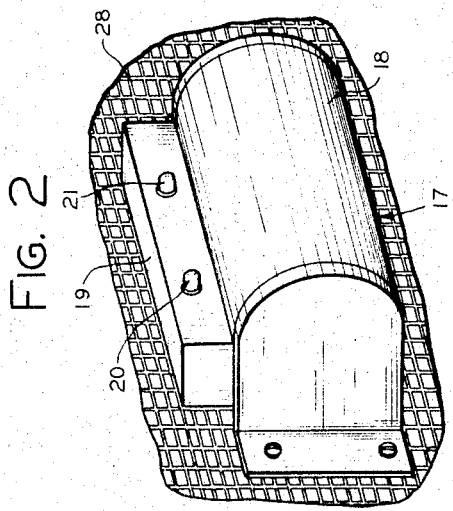
FIGURE 2 is a cross-sectional view through a housing for the simulator member of FIG. 1, and mounting indicating lights.

In FIG. 2 there is illustrated a sensor unit 17 including a housing 18 carrying the simulator 10 for ready mounting on a refrigerating case, and including a wiring compartment 19 which provides a mounting for indicating lamps 20 and 21. The lamp 20 is connected in the warning circuit so as to light at all times when current is flowing in the circuit, or in other words when the system is in operating condition. The circuit of lamp 21 is controlled by the thermistor 14, so as to light only when the system responds to a predetermined temperature to give a warning indication.

Figure 3:
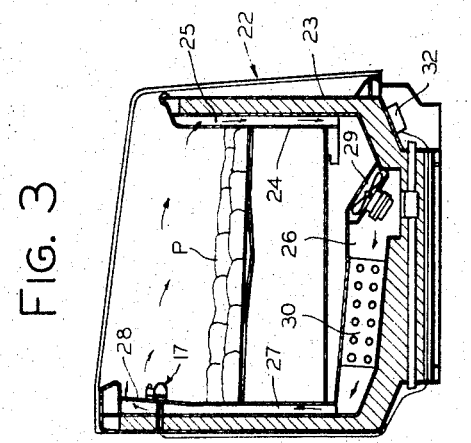
FIGURE 3 is a diagrammatic cross-sectional view through one type of commercial refrigerated cases with the simulator member mounted thereon and connected to a monitor in this case also mounted on the case.

A refrigerating case, generally designated 22, is shown in FIG. 3, with a sensor unit applied thereto. This case is of a known type, open at the top for ready access to the contents by purchasers. It comprises an outer shell 23 within which is disposed an inner shell or liner 24 spaced from the front, bottom and back of the outer shell to define forward, bottom and rear passageways 25, 26 and 27 respectively for circulation of refrigerating air over the food or other products P. Apertures such as those of the grille portion 28 (FIG. 2) in the inner shell 24 at the rear of the case provide for flow of the air forwardly toward the front case wall. The bottom passage 26 is enlarged to accommodate a fan or blower 29 or other suitable air-moving means, and evaporator coils 30 of a known type of refrigeration system. The air is drawn downwardly through passage 25, passes over the evaporating coils, and moves upwardly through the rear passage 27 to be discharged again in cool condition from the grille 28 and pass over and maintain in refrigerated condition the products P supported in the case 22 by shelves, racks or other appropriate means. The air then again flows through the passages for cooling and recirculation.

The simulator 10, corresponding in its time-temperature constant to the items or products P, is included in the sensor unit 17, which is mounted in any suitable manner on the rear wall of the inner shell or liner 24, in the path of air issuing from the openings or grille 28, so as to be subjected to substantially the same environment, including refrigerating temperature, as the products in the case. A case monitor device 32 controlled by the simulator 10 is electrically connected to the simulator and is mounted in any desired location, in this case in the space enclosed by the base cladding of the case 22. It will be appreciated that if desired, the warning lamp 21 might be provided in the case monitor 32, in which event it would be necessary to mount the monitor 32 in a location where it could easily be seen in order to determine whether the simulator in the case 22 was signaling the occurrence of the predetermined temperature. Such mounting, of course, could be on the case, or elsewhere. If desired, the warning lamp might be mounted on a central indicating panel, together with warning lamps of other refrigerating cases, each suitably marked to identify the respective case. It will also be appreciated that instead of the warning lamp 21, or in addition thereto, an audible alarm such as a bell, buzzer, horn or the like, or a moving signal, might be employed. The location of the warning lamp 21 on the sensor unit 17 provides for an easily seen indication within the case with which the simulator and the warning lamp are associated.

The simulator 10 provides for the best practicable manner of protecting food products or other items or articles under refrigeration, since it in effect takes the place of the product itself. If the thermistor 14 could as a practical matter be disposed within the product itself, the best possible indication of the temperature of the product would be obtained. Since the insertion of a temperature-responsive element in a refrigerated product or the like is impracticable, the use of a member substantially identical in the relevant characteristic, that is, the time-temperature constant, having a thermistor or other temperature-responsive element disposed therein, provides the best approach to determining the temperature condition of the product, and providing a warning if such condition becomes an undesirable one.

It is, of course, important that the device, member or body simulating the product or other refrigerated article be subjected to the same environmental conditions as the product, in order to give a valid indication of the product condition. In the particular instance disclosed, the simulator 10 is disposed in a location which subjects it to refrigerating air at substantially the same temperature as that supplied to the product P. Its temperature is thus maintained at substantially the same value as that of the product, particularly the outer or what may be termed the marginally refrigerated layer or portion of a quantity of the product or articles under refrigeration. The temperature of the outer layers or portion of a quantity of refrigerated items, especially the top portion, varies more quickly in response to changes in the temperature of the ambient atmosphere than does the temperature of the interior items or portions, which are insulated by the outer layers. It is thus advantageous to have the simulator arranged in correspondence to the outer or marginal portions of such a quantity of refrigerated products or articles, and such arrangement of the simulator in substantially the same environment as the product is achieved by its location substantially as disclosed. The particular simulator location may be varied, however, depending upon the particular portion and construction of the case and other circumstances. In general, a central location along the length of the case is preferable, although the simulator may be located elsewhere longitudinally of the case so long as it is fully within the influence of the refrigerating air supplied to the case.

Figure 4:
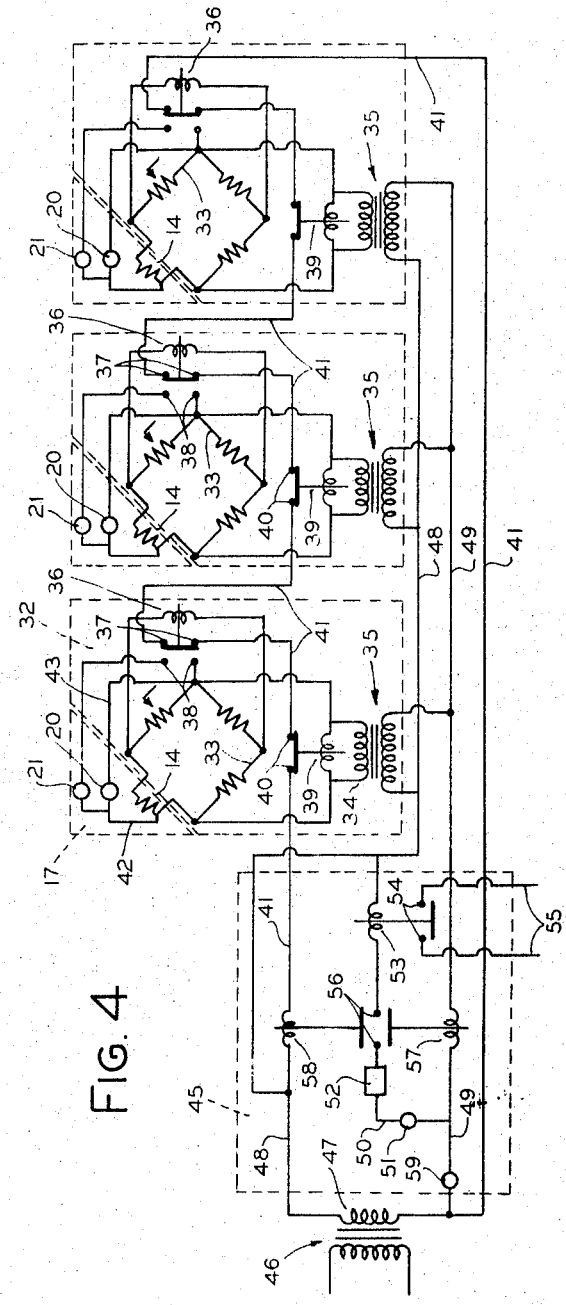
FIGURE 4 is a diagram of a circuit comprising a number of simulator members connected in controlling relation with respective monitors operatively connected to a master monitor.

Each case monitor 32, as shown in FIG. 4, comprises a bridge 33 which includes as one leg thereof the thermistor 14 of the associated sensor unit 17, and which has two opposed junction points connected to the opposite sides of the secondary winding 34 of a transformer 35 preferably included as part of the monitor. Connected across the other two junction points of the bridge 33 is the coil of a warning relay 36 which in its normally de-energized condition bridges or connects the contacts 37, of one of two pairs of contacts, and upon energization connects the contacts 38, constituting the other pair of contacts. The relay 36 is normally de-energized, being in series with the thermistor 14, which in this instance has a negative temperature coefficient of resistivity and prevents flow of current therethrough except when its response temperature is reached. Flow of current in the thermistor leg, however, can occur only when the resistance in the thermistor side of the bridge circuit is less than the resistance in the other side, which is preset by a conventional potentiometer and corresponds to a predetermined temperature of the simulator body. Across the transformer secondary 34 is connected the winding of a second relay 39 normally energized to close a pair of contacts 40. The pairs of contacts 37 and 40 are arranged in a line 41 divided into portions thereby, one portion leading from a master monitor or control, described hereinafter, to one contact 40, another portion connecting the other contact 40 to one of the contacts 37, and a third portion extending from the other contact 37 either to a contact 40 of another case monitor or to the master monitor. A line 42 extending from one side of the transformer secondary 34 and thermistor 14 has the lamps 20 and 21 connected thereto in parallel, the normal indicator lamp 20 being connected to the other side of the secondary 34 through a line 43. The warning lamp 21 is connected to one of the contacts 38, the other contact being connected to the other side of the secondary 34. Warning lamp 21 thus is lighted only when the contacts 38 are closed by energization of relay 36, while lamp 20 is illuminated at all times when current flows in the transformer secondary. The relay 36 is energized upon current flow through the thermistor 14 sufficient to excite the relay, whereupon a circuit is closed through the lamps 20 and 21 so that the warning indication is given by the latter. At the same time, the line 41 is opened, which as explained hereinafter causes actuation of warning or alarm means. De-energization of relay 39 has the same effect of interrupting line 41.

The sensor unit 17 and the case monitor 32 constitute a sensor station for the case 22, and may be employed to give warning of an undesired product temperature in the individual refrigerating case, particularly if the warning lamp 21 is replaced by a suitable audible signal, whether carried by the sensor unit 17 or the case monitor 32. Each refrigerating case in a supermarket or other location may thus be individually provided with an effective an positively reliable warning device or apparatus in the form of the sensor station, with the refrigerated products or other articles in the store protected thereby against subjection to respectively undesirable temperature.

The invention, however, contemplates the provision of a warning system employing a master control or monitor 45 connected to all of a given plurality of sensor stations or case monitors 32, one in each of a corresponding number of refrigerating cases, to give a warning or alarm signal upon actuation of any of the case monitors in response to the associated simulator. The particular case in which difficulty may have developed is identified by the lamp 21 or other warning means employed with the sensor station. In FIG. 4 there is illustrated one circuit which may be used to provide the warning system, employing the simulators 10, case monitors 32, and a master monitor 45 (FIG. 4). The circuit is preferably operated at low voltage, for which purpose a transformer 46 may be employed. Electric current from any suitable source, not shown, such as a source of 115-volt 60-cycle alternating current may be brought by the transformer to a suitable voltage, such for example as 24 volts. The transformer 46 may be included in the master monitor 45, or merely electrically connected thereto. In either case, the secondary 47 of the transformer powers the primaries of the case monitor transformers 35, connected in parallel to each other, by lines 48 and 49 extending from the opposite ends of the secondary 47. The transformers 35 are employed to provide a desired voltage, such as six volts. Three case monitors 32 are shown in FIG. 4, but the number may be considerably greater. Connected in parallel with the secondary 47 of transformer 46 by means of a conductor 50 extending between lines 48 and 49 are a warning lamp 51 and an audible warning signal 52, such as a buzzer or bell. In series with the warning lamp 51 and audible signal 52 in the line 50 is the winding of an auxiliary warning relay 53 which when energized closes an auxiliary warning circuit through the terminals 54 of lines 55 which extend to any suitable alarm or signal, not shown, which may be remotely located at a considerable distance from the master control or monitor 45 and suitably supplied with power. The remote alarm or signal may be connected to the line 55 through telephone lines or the like, if desired. The line 50 is interrupted, being provided with suitable switch contacts 56 at the opposite ends of the gap or interruption, so that the circuit through the lamp 51, signal 52 and relay winding is normally open. Thus the warning lamp and the audible signal are prevented from giving any indication, and the relay 53 is de-energized to prevent operation of the remote alarm or signal. A pair of normally open relays 57 and 58 are provided, having in common the contacts 56 in the line 50. The warning circuit comprising the line 50 may thus be closed by either of these relays. The relay 57 has its coil arranged in series in line 49, so as to be energized and hold the bridging contact of the relay out of engagement with the contacts 56 so long as current of the proper value flows in the transformer circuit provided by the lines 48 and 49. Any interruption of electric current in these lines, beyond the parallel circuit provided by the secondary 47 and line 50, results in de-energization of the relay 57 to bridge the contacts 56 and thus close the circuit through the warning lamp 51 and audible signal 52, and also through the coil of relay 53, thereby to effect closing of the auxiliary or remote warning circuit. All of the alarms, warnings or signals are thus actuated to give immediate warning of the failure. Of course, if the failure were in the power supply, that is, ahead of the transformer 46, or between the secondary 47 and the connections of the line 50 thereto, there would be no actuation of the warning means, because no electrical power would be supplied to them. The other relay 58 is the main warning relay, provided for closing the warning circuit, this relay having its coil connected in the portion of line 41 extending to the one relay contact 40 of one of the case monitors 32. An indicating lamp 59 is arranged in one of the lines 48, 49 between the secondary 47 and the parallel line 50, to indicate when current is flowing through the transformer 46. Instead of the lamp 59, or in addition thereto, any of several well-known devices may be connected in the circuit to signal the failure of power supply through the transformer 46. Alternatively, or additionally, a similar warning device may be provided in the supply circuit ahead of the transformer 46 to warn of a power failure.

The line 41 is connected at one end to one side of the transformer secondary 47, as through line 48, and at its other end to one of the contacts 40 provided in what may be termed the first case monitor 32, as already explained. The other contact 40 is connected by another portion of line 41 to one contact 37 of the warning relay 36, the other of which is connected by a third portion of line 41 to one contact 40 of another of the monitors 32. The second contact 37 of this second case monitor is connected by another portion of line 41 with one contact 40 of the next or third monitor 32, and so on until the last case monitor, the second contact 37 of which is connected by a portion of line 41 to the other side of the transformer secondary 47. The coil of the main warning relay 58 and the respective contacts 40 and 37 of the several case monitors 32 are connected in series, and in parallel with the transformer primary 47. When the respective pairs of contacts 40 and 37 are bridged so as to close the circuit through its coil, the relay 58 is energized to maintain its bridging contact out of engagement with the spaced contacts 56 in the line 50 so that he warning or signal circuit remains open. If the connection between any of the pairs of contacts 40 or 37 is broken, the relay 58 is deenergized and closes the warning circuit by bridging the contacts 56, so that the warning lamp 51, audible signal 52, and, by operation of the auxiliary relay 53, the auxiliary or remote warning or alarm (not shown), are caused to operate and indicate the opening of the line 41. The relay 39 is also arranged to be deenergized to actuate the alarm circuit by opening the contacts 40 of line 41, in the event of a power failure in its case monitor 32. In the event of failure of the secondary circuit of transformer 35, as by breaking of a wire or connection in the monitor 32, the consequent deenergization of the relay 39 opens the circuit through the relay 58, which then acts to close the warning circuit as explained. The normal operation indicator lamp 20 will at the same time be extinguished, and thus serve to identify the case monitor in which the trouble causing the alarm has occurred.

Should more than one of the cases develop difficulty at the same time, or during the same period, the warning system would be actuated only once, but the warning lamp 21 of each such case would indicate that it required attention to correct the trouble leading to the giving of the warning or alarm. If for any reason the warning lamp indication of one of the cases should be ignored or overlooked, and the necessary repair or adjustment was not made, the sensor station of this case would actuate the alarm system immediately upon restoration of proper operation of the other case or cases, which then would have no indication of any difficulty, and the warning indication in the overlooked case would then quickly be found.

It will be understood that the electrical circuitry disclosed is exemplary, and that other circuit arrangements may be provided to effect an alarm or warning upon attainment of a predetermined temperature in a simulating device member or body to cause operation of a thermistor or other suitable temperature-responsive element. While the disclosed apparatus employs alternating current for its operation, direct current may be used to actuate suitable equipment to obtain the same warning results, if desired.

The invention as disclosed herein provides an important improvement in warning systems generally, in that it employs the best practically available basis for automatic determination of the temperature condition of an article, product, or other item, so as to eliminate false warnings and provide positive and effective protection against deterioration of or damage to the protected item.

It will be understood that the single embodiment of the invention illustrated herein is exemplary of the inventive concept and that the invention is not limited to such embodiment, since modifications and variations thereof, may be made without departing from the spirit and scope of the invention as set forth in the appended claims.

We claim:

1. A temperature-sensitive device simulating a refrigerated product subjected to deterioration at a given temperature higher than its refrigerating temperature, said device comprising a body including a core of cold rolled steel and an envelope of foamed plastic material surrounding said core, said body having substantially the same time-temperature constant as said product, a thermistor disposed in said body core responsive to a predetermined temperature lower than said given temperature and higher than said refrigerating temperature, and electrical leads extending from said thermistor for connection thereof in an electrical warning circuit.

2. A temperature-sensitive device simulating a product subject to deterioration at a given temperature and preserved from deterioration by subjection to a protective temperature, said device comprising a body including a metal core and a heat-insulating coating about said core, said body having substantially the same time-temperature constant as said product, a thermistor enclosed within said body core responsive to a temperature falling between said protective temperature and said given temperature, and means for connecting said thermistor in controlling relation with an electrical circuit.

3. A temperature-sensitive device simulating a refrigerated product subject to deterioration at a given temperature other than its refrigerating temperature, said device comprising a body including a metal core and an envelope of heat-insulating material surrounding said core, said body having substantially the same time-temperature constant as said product, an electric current controlling element disposed in said body core responsive to a predetermined temperature between said given temperature and said refrigerating temperature, and electrical leads extending from said element for connection thereof in an electrical warning circuit.

4. A temperature-sensitive device comprising a composite body including a metal core and a coating enclosing said core and of a different material, a temperature-responsive element disposed in said core, and means for connecting said element in controlling relation with an electrical circuit, said body having a predetermined time-temperature constant and the element being responsive to a predetermined temperature in the body.

5. Apparatus for warning of the approach of a deleterious temperature condition in a product subject to deterioration at a given temperature and subjected to a protective temperature for prevention of such deterioration, comprising warning means, an electrical circuit for actuating said warning means, a temperature-sensitive device including a temperature-responsive element and a body of material surrounding said element and having a time-temperature constant substantially the same as that of said product, said device being disposed for subjection to the same ambient temperature as the product, the element being responsive to a temperature between said given and protective temperatures, and means connecting the device in controlling relation to said circuit.

References Cited

UNITED STATES PATENTS

| | | | |
|---|---|---|---|
| 2,585,086 | 2/1952 | Brunsing | 62—125 X |
| 2,741,099 | 4/1956 | Beane | 62—126 |
| 2,799,758 | 6/1957 | Huchins | 338—28 |
| 2,923,786 | 2/1960 | Jones. | |
| 2,932,971 | 4/1960 | Moore et al. | 340—227 X |
| 3,100,383 | 8/1963 | Foster et al. | 62—126 |
| 3,175,178 | 3/1965 | Boddy | 338—28 |
| 3,199,348 | 8/1965 | Salera | 338—28 X |

NEIL C. REID, *Primary Examiner.*

D. YUSKO, *Assistant Examiner.*